(12) United States Patent
Sedlmeyer

(10) Patent No.: US 7,877,811 B2
(45) Date of Patent: Jan. 25, 2011

(54) METHOD FOR RETRANSMISSION OF USE AUTHORIZATION INFORMATION

(75) Inventor: Robert Sedlmeyer, Ismaning (DE)

(73) Assignee: Institut für Rundfunktechnik GmbH, München (DE)

( * ) Notice: Subject to any disclaimer, the term of this patent is extended or adjusted under 35 U.S.C. 154(b) by 1069 days.

(21) Appl. No.: 11/630,166

(22) PCT Filed: Mar. 30, 2006

(86) PCT No.: PCT/EP2006/002885

§ 371 (c)(1),
(2), (4) Date: Dec. 20, 2006

(87) PCT Pub. No.: WO2007/009507

PCT Pub. Date: Jan. 25, 2007

(65) Prior Publication Data

US 2008/0301818 A1    Dec. 4, 2008

(30) Foreign Application Priority Data

Jul. 20, 2005    (DE) .................. 10 2005 033 836

(51) Int. Cl.
*G06F 21/00* (2006.01)

(52) U.S. Cl. .............. 726/26; 726/22; 726/23; 726/24; 726/25; 726/27; 726/28

(58) Field of Classification Search .............. 726/22–28
See application file for complete search history.

(56) References Cited

U.S. PATENT DOCUMENTS

| 7,212,634 | B2* | 5/2007 | Briscoe | 380/203 |
| 2002/0176576 | A1* | 11/2002 | Abe et al. | 380/227 |
| 2003/0076955 | A1* | 4/2003 | Alve et al. | 380/201 |
| 2007/0133806 | A1* | 6/2007 | Asano | 380/277 |

FOREIGN PATENT DOCUMENTS

| WO | WO 03/039155 A | 5/2003 |
| WO | WO 03/098931 A | 11/2003 |

OTHER PUBLICATIONS

Ernesto Damiani, DTI—Uiversita Di Milano: "XML and Security" XML and Security [online] Nov. 2003 (Nov. 2001)11, XP002389008.
DVB: "CPCM Reference Model, Working Draft" Digital Video Broadcasting (DVB) Content Protection and Copy Management (CPCM) System, [online], Jun. 28, 2005, XPOO2389009.
DVB: "Usage State Information (USI), Working Draft", Digital Video Broadcasting (DVB) Content Protection and Copy Management (CPCM) System, [online], Jun. 28, 2005, XP002389010.
International Search Report Dated Jul. 20, 2005 issued PCT/EP2006/002885.

* cited by examiner

*Primary Examiner*—Nasser Moazzami
*Assistant Examiner*—Ghazal Shehni
(74) *Attorney, Agent, or Firm*—Venable LLP; Robert Kinberg; Todd Farnsworth

(57) ABSTRACT

In order to reduce the multitude of data for transmitting and converting use authorizations, which are received either encoded or non-encoded together with sound and/or picture contents in signals from optional networks, it is proposed to reduce the hierarchically structured use authorization information in the form of a tree structure before transmitting it further, such that non-occupied tree branches are detected and marked as not relevant, wherein the tree branches marked as not relevant are not included during the further transmitting of the use authorization information.

2 Claims, 3 Drawing Sheets

METHOD FOR RETRANSMISSION OF USE AUTHORIZATION INFORMATION

Figure 1:
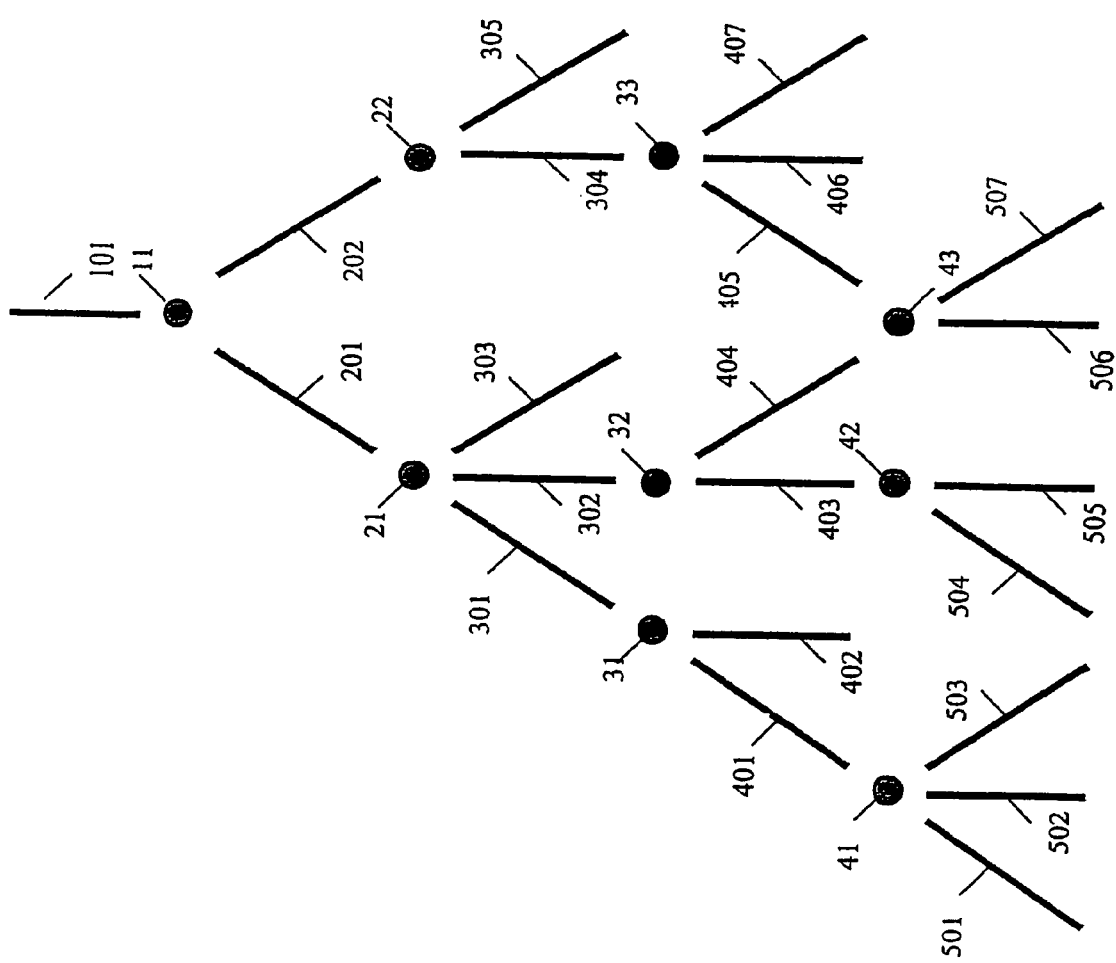

The invention relates to a method for transmitting use authorization information.

The illegal copying of pre-recorded media with protected sound and/or picture contents, using personal computer programs, has resulted in a series of technical measures to prevent this illegal copying or to make it more difficult. In contrast to such copy-protect systems, the "Content Protection and Copy Management" (CPCM) systems allow using the content of a recording medium only under specific licensing conditions. The basic idea behind CPCM systems is to predetermine a separate signaling for each authorized use to its content, which is added to the picture and/or sound contents and can be analyzed by suitable receivers. American producers of picture and/or sound contents imagine the use of up to 55 different types of signals, which not only control the copying of the content, but to the smallest detail also each operation realized with the content.

The transmitting of so many different use authorizations, however, requires a multitude of data at the cost of the picture and/or sound contents transmitting capacity. Since each use of the content must first be checked to determine whether or not the use is authorized, the use authorization information must be analyzed prior to permitting the use of the contents. For this, all use information that is generally transmitted either encoded or in the form of a watermark must be decoded or extracted and then analyzed. The use authorization information furthermore must also be transmitted repeatedly parallel to the content for determining an authorized use, even if the receiver is activated later on. The multitude of data to be transmitted therefore increases enormously. The time delay to the earliest point in time at which the content can be displayed is determined by the time interval between two such repetitions, together with the speed of the evaluation. For all the above-stated reasons, the conversion of the extensive signaling in consumer electronic devices is extremely involved and, among other things, requires a considerable amount of processor capacity.

It is therefore the object of the present invention to reduce the multitude of data required for transmitting and converting use authorization information.

This object is solved according to the invention with the characterizing features disclosed in the independent claims 1 and 2.

Figure 2:
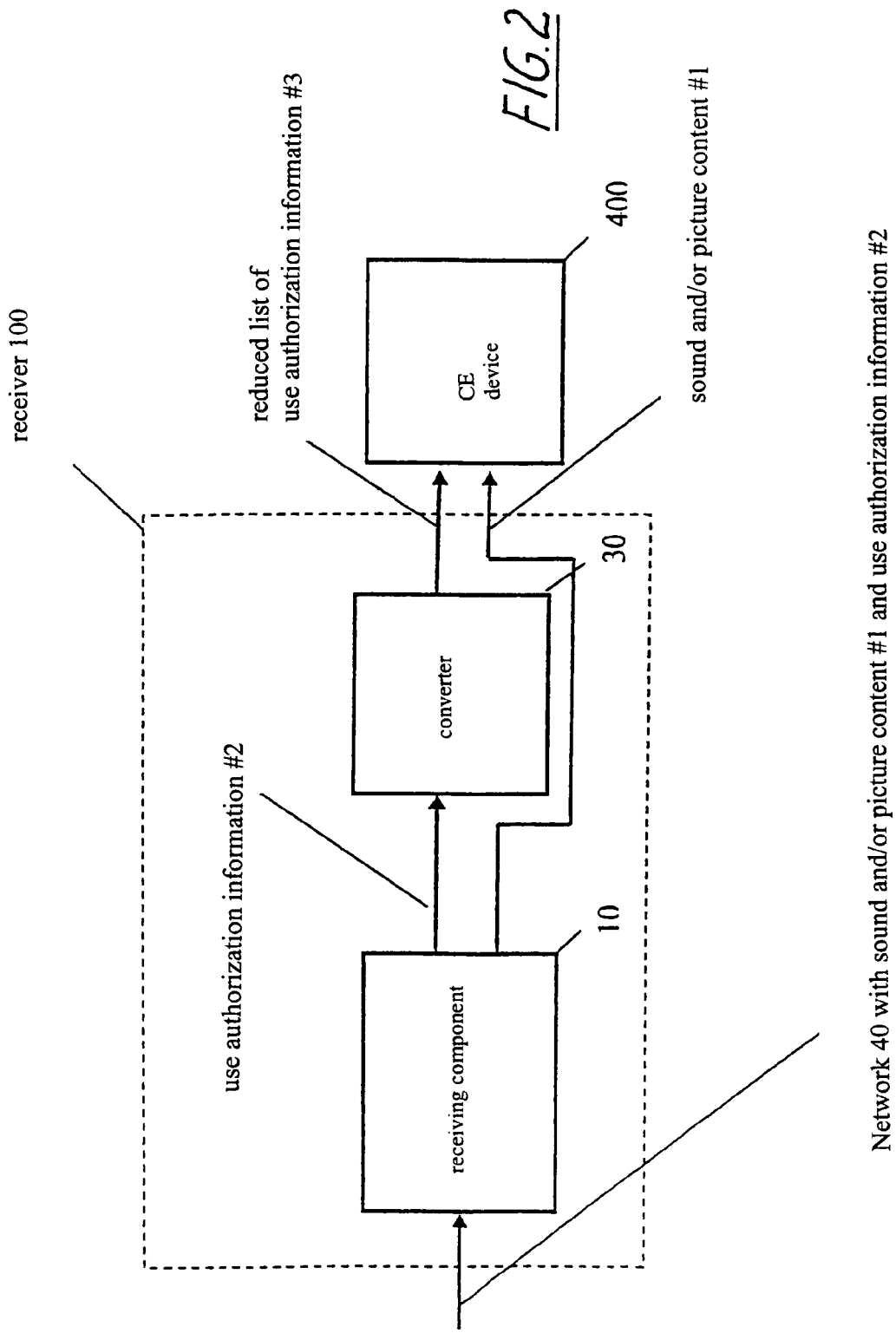
Figure 3:
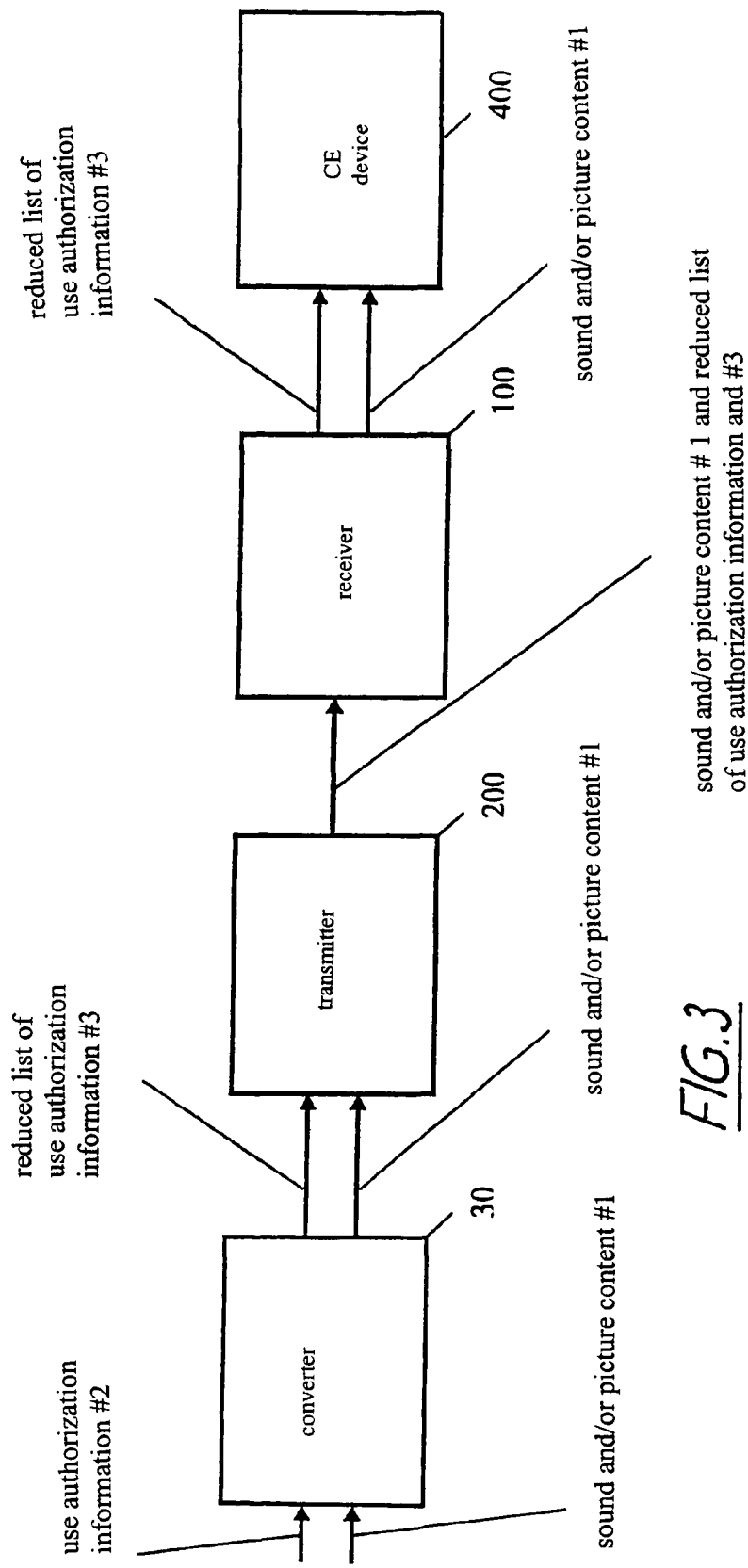

The invention is explained in further detail with the aid of an exemplary embodiment shown in the drawings, which show in:

FIG. 1 A schematic representation of a hierarchical division of use authorization information for picture and/or sound contents, in the form of a tree structure; and FIG. 2 A block diagram of a device according to the invention for transmitting use authorization information for picture and/or sound contents;

FIG. 3 A block diagram of an alternative device according to the invention for transmitting use authorization information for picture and/or sound contents.

The block diagram in FIG. 2 shows a device according to the invention, comprising a receiver with reference 100, which receives from a network 40 a picture and/or sound content 1 along with use authorization information 2 in the form of signal components. The network 40 can be a radio broadcasting network, for example, which corresponds to the DVB (digital video broadcasting) standard of the EUROPÄISCHE RUNDFUNKUNION [European Broadcasting Union], or it can be the Internet. Together with the picture and/or sound contents 1, the respective signaling is designed to transmit the use authorization information 2, which either allows unlimited use of the received picture and/or sound contents, or which subjects this use to predetermined conditions (with negative signaling). Alternatively, all options for permitting the use can also be transmitted in the form of authorizations (with positive signaling). The following examples for a restricted use show a restriction to "authorized domains" and "local environment," such as are presently proposed by the DVB for the DVB Content Protection and Copy Management System under discussion. In one case, all devices are located in a single household and form an "authorized domain," within which the contents can be used, provided they were characterized accordingly. In the other case, all devices are located in the immediately surrounding area and form a "local environment," within which the contents can be used, provided they were characterized accordingly. Corresponding to the concept proposed by the DVB, a so-called proximity test is used for determining the immediate proximity of devices. For this test, the receiver 1 transmits an identification signal to a consumer electronic device 2 in order to determine the immediate proximity and requests that the device 2 transmit this identification signal back as soon as possible. The distance between the devices 1 and 2 can then be determined on the basis of the time delay before the identification signal returns to the receiver 1. The permissible time delay can be preset, for example with a parameter that is transmitted along.

In the receiver 100, a converter 30 is connected between the receiving component 10 and the consumer electronic device 400 for reducing the multitude of data constituting the use authorization information. The authorization information 2 list initially contains all individual options for restricting as well as authorizing an individual use. However, since the content of such a list is organized logically, corresponding to the hierarchical tree structure shown with the example in FIG. 1, this list is reduced in the converter 3 and is then transmitted in the form of a "narrowed-down list" 3 together with the picture and/or sound content to the consumer electronic device 400.

For the block diagram of an alternative embodiment according to the invention, shown in FIG. 3, the converter 30 is already connected upstream of a transmitter 200 on the transmitting side, such that the converter can reduce the use authorization information 2 list and can transmit this list in the form of a "narrowed-down list" 3 to the transmitter 200. The transmitter 200, in turn, combines the "narrowed-down list" 3 with the picture and/or sound contents 1 and then transmits the list further. The receiver 100 thus already receives a "narrowed-down list" 3 with use authorization information in addition to the picture and/or sound contents 1 and forwards both to the consumer electronic device 400.

FIG. 1 will be explained in further detail in the following.

The use authorization information always relates either to a single content or several contents. The use authorization information for the single content is arranged hierarchically in the form of a tree structure. With negative signaling, the use authorization information consists of individual restrictions for using the content. With positive signaling, the information consists of individual authorizations for using the content. All individual use restrictions or authorizations for use of the content jointly represent the use authorization information.

Each of the branches 101 to 507, shown in FIG. 1, represents a restriction of the use of the content when the signalizing is negative. A decision is made at each of the branching points 11 to 43 to determine whether or not one or several of the downward branching branches should signal use restrictions. If a downward branching branch with a negative signaling in the form of use restrictions is not utilized, meaning the use restrictions as defined for this branch are not used, then a marking only is transmitted instead of the information signaling no use restrictions on all branches underneath, wherein this marking indicates that all downward branching branches are not relevant because they do not contain use restrictions. The multitude of data to be transmitted can be reduced considerably in this way because it almost never happens in practical operations that all possible branches with all their options are utilized for restricting the use. A similar action occurs with the positive signaling in the form of authorizations. If a downward leading branch is not used, meaning no-use authorizations corresponding to this branch are used, then a marking only is transmitted in place of the individual information signaling no authorizations for the branches located underneath, wherein this marking indicates that the downward branching branches are not relevant because they do not contain authorizations.

For one concrete exemplary embodiment of the method, the two branches 201 and 202 start at the first branching point 11, wherein 201 indicates a restriction of the use of the content of a so-called "authorized domain" while 202 indicates a restriction of the use of the content of a so-called "local environment."

If no restriction of the use corresponding to an "authorized domain" or a "local environment" is used at the branching point 11, then the signaling only contains the information that the continuing branches 201 and 202 do not contain use restrictions. This could be the case, for example, for freely available contents. If only one restriction is used, either based on the concept of "authorized domain" or a "local environment," it signals that only this branch contains use restrictions, or it signals that the non-used branch does not contain any use restrictions.

Within the example of a concrete embodiment of the method, for which the two branches 201 and 202 represent a restriction of use to an "authorized domain" and/or a "local environment," the branches 301 to 303, 404, and 501 to 505 could then predetermine further details of the use restriction within an "authorized domain," for example a geographic restriction to a country, or time restrictions to approximately one week, a time-delayed display with a time offset of up to a maximum of 90 minutes. The branches 304 to 305 and 405 to 407, on the other hand, could describe further details of the restriction to a "local environment," such as the parameters for identifying the immediately surrounding area.

Several downward-curving branches could also grow together and recombine, as shown for the branches 506 and 507 at the branching point 43. With a negative signaling in the form of use restrictions, the intersection of both restrictions is used, meaning the use range is even smaller. For a concrete exemplary embodiment of the method, for which both branches 201 and 202 correspond to a restriction of the use to an "authorized domain" and/or a "local environment," it would mean that the use of the content is restricted to a so-called "local authorized domain," which corresponds to the intersection of all signaled restrictions of the "authorized domain" with that of all signaled restrictions of the "local environment."

For different branches that correspond to different use restrictions, different conditions can furthermore be specified as mechanisms for determining the authorized use, wherein this can include a daily check of the geographic receiving position of a device, for example, or an hourly check of the association of a device to an "authorized domain." As a result, it is possible to further accelerate the decision-making process for determining whether or not the content can be used.

The invention claimed is:

1. A method for retransmission of use authorization information received by a retransmission device in encoded or unencoded form, together with at least one of sound and image contents from transmission networks of any kind to a consumer electronic device, comprising:
   hierarchically structuring, by the retransmission device, said use authorization information in the manner of a tree structure having decision branch points, wherein said use authorization information consists of use restrictions or use permissions;
   making a decision, by the retransmission device, at each branch point as to whether or not the use restrictions or the use permissions will be signaled on one or more descending branches from each branch point; and
   transmitting, by the retransmission device, a mark indicating that all of the descending branches from a respective branch point are not relevant during retransmission of the use authorization information to the consumer electronic device, instead of transmitting individual pieces of information that would signal the absence of the use restrictions or the use permissions in each of the descending branches.

2. A device for retransmission of use authorization information received in encoded or unencoded form, together with at least one of sound and image contents from a transmission networks to a consumer electronic device, the device for retransmission implementing operations comprising:
   hierarchically structuring, by the device for retransmission, said use authorization information in the manner of a tree structure having decision branch points, wherein said use authorization information consists of use restrictions or use permissions;
   making a decision, by the device for retransmission, at each branch point as to whether or not the use restrictions or the use permissions will be signaled on one or more descending branches from each branch point; and
   transmitting, by the device for retransmission, a mark indicating that all of the descending branches from a respective branch point are not relevant during retransmission of the use authorization information to the consumer electronic device, instead of transmitting individual pieces of information that would signal the absence of the use restrictions or the use permissions in each of the descending branches.

* * * * *